Figure 1:
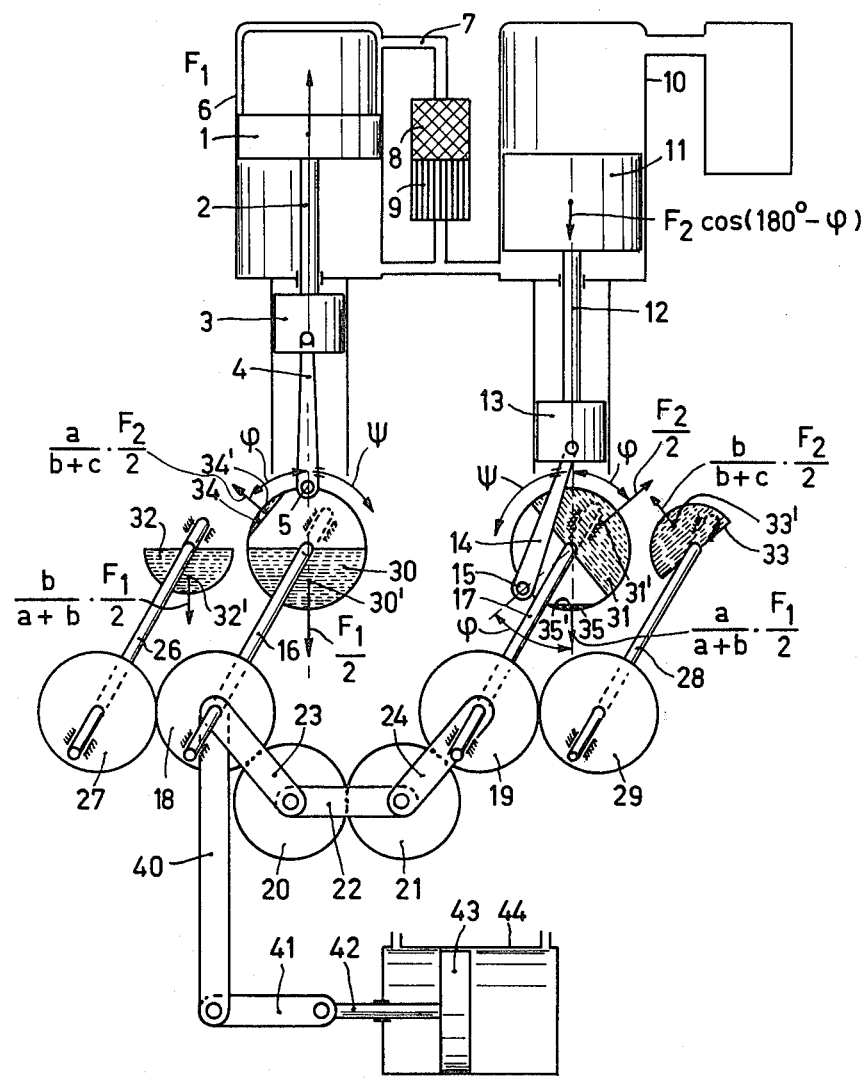

United States Patent [19]

Vos

[11] 4,357,799

[45] Nov. 9, 1982

[54] HOT-GAS RECIPROCATING MACHINE

[75] Inventor: Jan Vos, Eindhoven, Netherlands

[73] Assignee: U.S. Philips Corporation, New York, N.Y.

[21] Appl. No.: 171,694

[22] Filed: Jul. 24, 1980

[30] Foreign Application Priority Data

Aug. 10, 1979 [NL] Netherlands ................ 7906116

[51] Int. Cl.$^3$ ............................................... F02G 1/04
[52] U.S. Cl. .................................................... 60/518
[58] Field of Search .................................. 60/517–526

[56] References Cited

U.S. PATENT DOCUMENTS 2,508,315  5/1950  Van Weenen ..................... 60/518
2,583,311  1/1952  Van Heeckeren .................. 60/518
3,482,457 12/1969  Wallis ............................... 60/518 X Primary Examiner—Allen M. Ostrager
Attorney, Agent, or Firm—David R. Treacy

[57] ABSTRACT

A hot-gas reciprocating machine comprises two intercommunicating spaces of variable volume and two pistons (1 and 11) for varying the volumes of these spaces. The two pistons are coupled to two parallel crank shafts (16 and 17) and are movable with an adjustable phase difference. For balancing the engine a system of counterweights is provided comprising a counterweight (30, 31) on each crank shaft and a counterweight (32, 33) on each of two auxiliary shafts (26, 28) which are coupled one to each crank shaft for rotation therewith at the same speed as and in the opposite direction, each auxiliary shaft extending parallel with the associated crank shaft on the side thereof remote from the other crank shaft. The counterweight on each crank shaft is so arranged that the centrifugal force of that counterweight in the operation of the machine equal half the force produced by the reciprocating parts coupled to the respective crank shaft, and the counterweight on each auxiliary shaft is so arranged that the horizontal and vertical components of the centrifugal force of that counterweight always act respectively in the opposite direction to and the same direction as the corresponding components of the centrifugal force of the counterweight on the associated crank shaft.

3 Claims, 2 Drawing Figures

HOT-GAS RECIPROCATING MACHINE

The invention relates to a hot-gas reciprocating machine comprising first and second spaces of variable volume which communicate with each other through a regenerator, and first and second pistons for varying the volumes of the first and second spaces respectively, the first and second pistons being parallel to first and second crank shafts respectively.

A hot-gas reciprocating machine of this construction is known from British Pat. No. 1,527,838. In this known hot-gas reciprocating machine, each of the crank shafts comprises two cranks spaced at an angle of 90°, a third shaft being provided for balancing.

It is an object of the present invention to provide a hot-gas reciprocating machine of the above construction in which the first and second pistons are movable with an adjustable phase difference and which is fully balanced for one phase angle as regards the first order forces and torques, the unbalanced forces and torques not exceeding an acceptable value in the case of deviation from said phase angle.

In one embodiment of the invention in which the first and second crank shafts are so coupled that they rotate in opposite directions during operation, the mass of the counterweight on the first auxiliary shaft and the distance between its centre of gravity and the axis of the first auxiliary shaft are such that the centrifugal force of this counterweight occurring during operation equals $$\frac{b}{a+b} \times \frac{F_1}{2},$$

the mass of the counterweight on the second auxiliary shaft and the distance between its centre of gravity and the axis of the second auxiliary shaft are such that the centrifugal force of this counterweight occurring during operation equals $$\frac{b}{c+b} \times \frac{F_2}{2},$$

on the first crank shaft there is arranged a second counterweight whose centre of gravity is situated in a plane containing the axis of the first crank shaft and forming with the plane which contains the axes of the first crank shaft and the associated crank pin an angle equal to the phase angle, the centrifugal force of this counterweight which occurs during operating being equal to $$\frac{c}{b+c} \times \frac{F_2}{2},$$

and on the second crank shaft there is arranged a second counterweight whose centre of gravity is situated in a plane containing the axis of the second crank shaft and forming with the plane which contains the axes of the second crank shaft and the associated crank pin an angle equal to the phase angle, the centrifugal force of this second counterweight which occurs during operation being equal to $$\frac{a}{a+b} \times \frac{F_1}{2},$$

in which:

a = distance between the axes of the first crank shaft and first auxiliary shaft,
b = distance between the axes of the first crank shaft and second crank shaft,
c = distance between the axes of the second crank shaft and second auxiliary shaft,
$F_1$ = the maximum force produced by the reciprocating parts coupled to the first crank shaft,
$F_2$ = the maximum force produced by the reciprocating parts coupled to the second crank shaft.

In another embodiment of the invention in which the first and second crank shafts are so coupled that they rotate in the same direction during operation, the mass of the counterweight on the first auxiliary shaft and the distance between its centre gravity and the axis of the first auxiliary shaft are such that the centrifugal force of this counterweight occurring during operation equals $$\frac{b+c}{a+b+c} \times \frac{F_1}{2},$$

the counterweight on the second auxiliary shaft has a centrifugal force during operation equal to $$\frac{a+b}{a+b+c} \times \frac{F_2}{2},$$

on the first auxiliary shaft there is arranged a second counterweight whose centre of gravity is situated in a plane containing the axis of the first auxiliary shaft and forming with the plane which contains the latter axis and the centre of gravity of the first-mentioned counterweight on the first auxiliary shaft an angle equal to the phase angle, the centrifugal force of the second counterweight on the first auxiliary shaft which occurs during operation being equal to $$\frac{c}{a+b+c} \times \frac{F_2}{2},$$

and on the second auxiliary shaft there is arranged a second counterweight whose centre of gravity is situated in a plane containing the axis of the second auxiliary shaft and forming with the plane which contains the latter axis and the centre of gravity of the first-mentioned counterweight on the second auxiliary shaft an angle equal to the phase angle, the centrifugal force of the second counterweight on the second auxiliary shaft which occurs during operation being equal to $$\frac{a}{a+b+c} \times \frac{F_1}{2},$$

in which a = distance between the axes of the first crank shaft and first auxiliary shaft,
b = distance between the axes of the first crank shaft and second crank shaft,
c = distance between the axes of the second crank shaft and second auxiliary shaft,
$F_1$ = the maximum force produced by the reciprocating parts coupled to the first crank shaft,
$F_2$ = the maximum force produced by the reciprocating parts coupled to the second crank shaft.

The first order forces and torques are thus fully balanced for the chosen phase angle between the first and the second crank shafts. When the phase angle changes, the unbalanced forces remain within acceptable limits.

It is noteworthy that, even though the full balancing of one crank shaft normally requires two auxiliary shafts with counterweights, two auxiliary shafts with counterweights also suffice for the balancing of two crank shafts in the engine in accordance with the invention.

Figure 2:
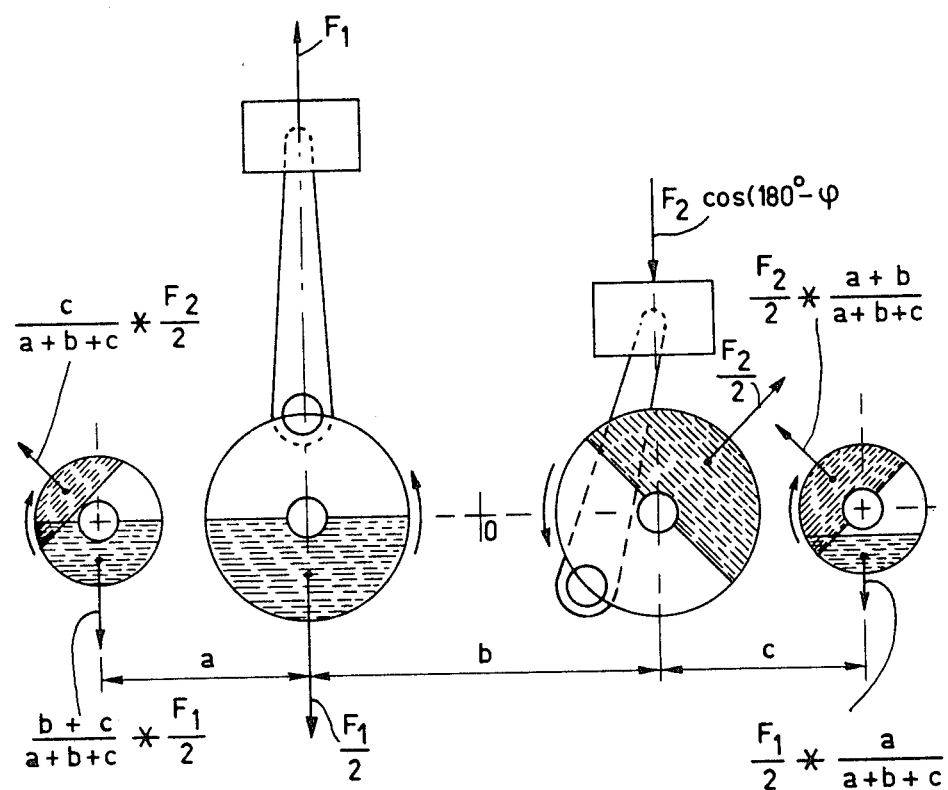

Embodiments of the invention will be described in detail hereinafter with reference to the accompanying diagrammatic drawings, in which, FIG 1 is a part-elevation, part-perspective view of a phase-controlled single-acting hot-gas engine comprising two crank shafts which rotate in opposite directions, and FIG. 2 is a diagrammatic representation of a similar engine which comprises two crank shafts which rotate in the same direction.

FIG. 1 shows diagrammatically a phase-controlled single-acting hot-gas engine comprising two pistons 1 and 11 which are connected to parallel crank shafts 16 and 17 which rotate in opposite directions. The first piston 1 is connected to a crank pin 5 via a piston rod 2, a guide piston 3 and a drive rod 4. The piston 1 is reciprocable in a cylinder 6 to vary with its upper side the volume of an expansion space in the cylinder, which space is connected, via a heater 7, a regenerator 8 and a cooler 9, to a compression space in a second cylinder 10 in which the second piston 11 is reciprocable. The latter piston 11 is capable of varying with its lower side the volume of the compression space in the cylinder 10. The piston 11 is connected to a crank pin 15 via a piston rod 12, a guide piston 13 and a drive rod 14. The crank pin 5 is rigidly connected to the first crank shaft 16 and the crank pin 15 is rigidly connected to the second crank shaft 17.

The crank shafts 16 and 17 are coupled to each other by means of a train of gearwheels 18, 19, 20 and 21 in such a manner that the two shafts rotate in opposite directions and also that the first piston 1 reaches its uppermost position at an instant at which the second piston is still spaced at an angle $\phi$, the phase angle, from its lowermost position.

The shafts of the gearwheels 20 and 21 are journalled in a yoke 22 which is supported by arms 23 and 24, which are each rotatable at one end about the crank shaft 16 or 17 respectively and at the other end about the shaft of the gearwheel 20 or 21 respectively. The arm 23 is rigidly connected to a further arm 40 which is rotatable about the crank shaft 16 and which is connected, via a coupling member 41, to a piston rod 42 of a piston 43 of a linear hydraulic or pneumatic motor 44. By means of this motor the arm 40 and hence the arm 23 can be pivoted about the crank shaft 16. This results in the gearwheel 20 rolling on the gearwheel 18, which is fixed on the crank shaft 16, so that the gearwheel 21 and hence also the gearwheel 19, which is fixed on the crank shaft 17, are rotated through a given angle with respect to the gearwheel 18. The angular positions of the gearwheels 18 and 19 with respect to each other are thereby varied to adjust the phase angle $\phi$ between the crank shafts and thus the phase angle between the movements of the pistons 1 and 11.

Parallel to the first crank shaft 16 is arranged a first auxiliary shaft 26 which is coupled, via a gearwheel 17 and the gearwheel 18, to the crank shaft 16.

Parallel to the second crank shaft 17 there is arranged a second auxiliary shaft 28 which is coupled, via a gearwheel 29 and the gearwheel 19, to the second crank shaft.

For the balancing of this hot-gas engine, on the first crank shaft there is provided a first counterweight 30 whose centre of gravity 30' is situated in the plane containing the axes of the crank shaft 16 and the crank pin 5. The mass of the counterweight 30 and the distance between its centre of gravity 30' and the axis of the crank shaft 16 are such that the vertical component of the centrifugal force of the counterweight 30 occurring during operation of the machine equals half the mass force $F_1 \cos \phi$ of the reciprocating parts 1, 2, 3, 4 connected to the crank pin 5.

On the second crank shaft 17 there is arranged a first counterweight 31 whose centre of gravity 31' is situated in the plane containing the axes of the crank shaft 17 and the crank pin 15. The mass of the counterweight 31 and the distance between its centre of gravity 31' and the axis of the crank shaft 17 are such that the vertical component of the centrifugal force of the counterweight 31 occurring during operation equals half the mass force $F_2 \cos(180-\phi)$ of the reciprocating parts 11, 12, 13, 14 connected to the crank pin 15.

On the first auxiliary shaft 26 there is arranged a counterweight 32 whose centre of gravity 32' is situated in a plane containing the axis of the shaft 26 such that the vertical and horizontal components of the centrifugal force of the counterweight 32 always respectively in the same direction as and the opposite direction to the corresponding components of the centrifugal force of the counterweight 30. The mass of the counterweight 32 and the distance between its centre of gravity 32' and the axis of the shaft 26 are such that the centrifugal force of the counterweight 32 occurring during operation equals $$\frac{b}{b+a} \times \frac{F_1}{2},$$

in which
 b = distance between the axes of the crank shaft 16 and crank shaft 17
 a = distance between the axes of the auxiliary shaft 26 and crank shaft 16.

On the second auxiliary shaft 28 there is arranged a counterweight 33 whose centre of gravity 33' is situated in a plane containing the axis of the shaft 28 such that the vertical and horizontal components of the centrifugal force of the counterweight 33 always respectively in the same direction as and the opposite to the corresponding components of the centrifugal force of the counterweight 31. The mass of the counterweight 33 and the distance between its centre of gravity 33' and the axis of the shaft 28 are such that the centrifugal force of the counterweight 33 occurring during operation equals $$\frac{b}{c+b} \times \frac{F_2}{2},$$

in which
 b = distance between the axes of the crank shaft 16 and crank shaft 17
 c = distance between the axes of the auxiliary shaft 28 and crank shaft 17.

Furthermore, on the first crank shaft 16 there is also arranged a second counterweight 34 whose centre of gravity 34' is situated in a plane containing the axis of the crank shaft 16 and forming with the plane which contains the axes of the crank shaft 16 and the crank pin 5 an angle equal to the phase angle $\phi$. The mass of this counterweight 34 and the distance between its centre of gravity 34' and the axis of the crank shaft 16 are such that the centrifugal force of the counterweight 34 occurring during operation equals $$\frac{c}{b+c} \times \frac{F_2}{2},$$

in which c and b again represent the distances described above.

Finally, on the second crank shaft 17 there is also arranged a second counterweight 35 whose centre of gravity 35' is situated in a plane containing the axis of the crank shaft 17 and forming with the plane which contains the axes of the crank shaft 17 and the crank pin 15 an angle equal to the phase angle $\phi$. The mass of this counterweight 35 and the distance between its centre of gravity 35' and the axis of the crank shaft 17 are such that the centrifugal force of the counterweight 35 occurring during operation equals $$\frac{a}{a+b} \times \frac{F_1}{2},$$

in which a and b represent the distances described above. Thus, using only two auxiliary shafts with counterweights, the first order forces and torques with respect to the central point 36 are fully balanced for one given phase angle $\phi$.

In the case of a deviation from this phase angle, two unbalanced rotating forces arise which, however, remain within acceptable limits.

The above description concerns balancing of a hot-gas engine comprising two crank shafts which rotate in opposite directions. An engine comprising crank shafts which rotate in the same direction can be balanced in a similar manner.

FIG. 2 is a diagrammatic representation of such engine, the magnitude of the centrifugal forces occurring during operation being given in the drawing of the counterweights. In this engine there is not a second counterweight on each crank shaft; instead a second counterweight, designated 34 and 35 respectively in FIG. 2, is provided on each of the auxiliary shafts 26 and 28. The centre of gravity 34', 35' of each second counterweight 34, 35 is then situated in a plane containing the axis of the respective auxiliary shaft 26, 28 and forming with the plane which contains the latter axis and the centre of gravity 32', 33' of the first counterweight 32, 33 on the respective auxiliary shaft 26, 28 an angle equal to the phase angle. Apart from this, the construction and operation of the engine shown in FIG. 2 are similar to the construction and operation of the engine shown in FIG. 1 and corresponding parts have been given the same reference numerals in the two figures.

What is claimed is:

1. A hot-gas reciprocating machine comprising first and second spaces of variable volume which communicate with each other through a regenerator, and first and second pistons for varying the volumes of the first and second spaces respectively, the first and second pistons being connected to parallel first and second crank shafts respectively and being movable with an adjustable phase difference, wherein each of the crank shafts carries counterweight whose centre of gravity is situated in the plane containing the axis of the respective crank shaft and the axis of the crank pin through which the respective piston is connected to that crank, and of which counterweight the centrifugal force occurring during operation of the machine corresponds to half the force produced by the reciprocating parts coupled to the relevant crank shaft, wherein on the side of the first crank shaft which is remote from the second crank shaft there is provided a first auxiliary shaft which extends parallel to the first crank shaft and which is coupled thereto in such a manner that the auxiliary shaft rotates in the opposite direction to and at the same speed as the first crank shaft, the first auxiliary shaft carrying at least one counterweight whose centre of gravity is so situated that during operation the horizontal and vertical components of the centrifugal force of the latter counterweight always act respectively in the opposite direction to and the same direction as the corresponding components of the centrifugal force of the counterweight on the first crank shaft, and wherein on the side of the second crank shaft which is remote from the first crank shaft there is provided a second auxiliary shaft which extends parallel to the second crank shaft and which is coupled thereto in such a manner that the second auxiliary shaft rotates in the opposite direction to and at the same speed as the second crank shaft, the second auxiliary shaft carrying at least one counterweight whose centre of gravity is so situated that during operation the horizontal and vertical components of the centrifugal force of the latter counterweight always act respectively in the opposite direction to and the same direction as the corresponding components of the centrifugal force of the counterweight on the second crank shaft.

2. A hot-gas reciprocating machine as claimed in claim 1, in which the first and second crank shafts are so coupled that they rotate in opposite directions during operation, wherein the mass of the counterweight on the first auxiliary shaft and the distance between its centre of gravity and the axis of the first auxiliary shaft are such that the centrifugal force of this counterweight occuring during operation equals $$\frac{b}{a+b} \times \frac{F_1}{2},$$

wherein the mass of the counterweight on the second auxiliary shaft and the distance between its centre of gravity and the axis of the second auxiliary shaft are such that the centrifugal force of this counterweight occurring during operation equals $$\frac{b}{c+b} \times \frac{F_2}{2},$$

wherein on the first crank shaft there is arranged a second counterweight whose centre of gravity is situated in a plane containing the axis of the first crank shaft and forming with the plane which contains the axes of the first crank shaft and the associated crank pin an angle equal to the phase angle, the centrifugal force of this counterweight which occurs during operation being equal to $$\frac{c}{b+c} \times \frac{F_2}{2},$$

and wherein on the second crank shaft there is arranged a second counterweight whose centre of gravity is situated in a plane containing the axis of the second crank shaft and forming with the plane which contains the axes of the second crank shaft and the associated crank pin an angle equal to the phase angle, the centrifugal force of this second counterweight which occuring during operation being equal to $$\frac{a}{a+b} \times \frac{F_1}{2},$$

in which:
- $a$ = distance between the axes of the first crank shaft and first auxiliary shaft,
- $b$ = distance between the axes of the first crank shaft and second crank shaft,
- $c$ = distance between the axes of the second crank shaft and second auxiliary shaft,
- $F_1$ = the maximum force produced by the reciprocating parts coupled to the first crank shaft,
- $F_2$ = the maximum force produced by the reciprocating parts coupled to the second crank shaft.

3. A hot-gas reciprocating machine as claimed in claim 1, in which the first and second crank shafts are so coupled that they rotate in the same direction during operation, wherein the mass of the counterweight on the first auxiliary shaft and the distance between its centre gravity and the axis of the first auxiliary shaft are such that the centrifugal force of this counterweight occurring during operation equals $$\frac{b+c}{a+b+c} \times \frac{F_1}{2},$$

wherein the counterweight on the second auxiliary shaft has a centrifugal force during operation equal to $$\frac{a+b}{a+b+c} \times \frac{F_2}{2},$$

wherein on the first auxiliary shaft there is arranged a second counterweight whose centre of gravity is situated in a plane containing the axis of the first auxiliary shaft and forming with the plane which contains the latter axis and the centre of gravity of the first-mentioned counterweight on the first auxiliary shaft an angle equal to the phase angle, the centrifugal force of the second counterweight on the first auxiliary shaft which occurs during operation being equal to $$\frac{c}{a+b+c} \times \frac{F_2}{2},$$

and wherein on the second auxiliary shaft there is arranged a second counterweight whose centre of gravity is situated in a plane containing the axis of the second auxiliary shaft and forming with the plane which contains the latter axis and the centre of gravity of the first-mentioned counterweight on the second auxiliary shaft an angle equal to the phase angle, the centrifugal force of the second counterweight on the second auxiliary shaft which occurs during operation being equal to $$\frac{a}{a+b+c} \times \frac{F_1}{2},$$

in which
- $a$ = distance between the axes of the first crank shaft and first auxiliary shaft,
- $b$ = distance between the axes of the first crank shaft and second crank shaft,
- $c$ = distance between the axes of the second crank shaft and second auxiliary shaft,
- $F_1$ = the maximum force produced by the reciprocating parts coupled to the first crank shaft,
- $F_2$ = the maximum force produced by the reciprocating parts coupled to the second crank shaft.

* * * * *